(12) United States Patent
Søndergaard et al.

(10) Patent No.: US 11,619,708 B2
(45) Date of Patent: Apr. 4, 2023

(54) SYSTEM AND METHOD FOR INTER-SENSOR CALIBRATION

(71) Applicant: TRACKMAN A/S, Vedbaek (DK)

(72) Inventors: Thomas Søndergaard, Vedbaek (DK); Fredrik Tuxen, Rungsted Kyst (DK); Michael Ungstrup, Vedbaek (DK)

(73) Assignee: TRACKMAN A/S, Vedbaek (DK)

( * ) Notice: Subject to any disclaimer, the term of this patent is extended or adjusted under 35 U.S.C. 154(b) by 177 days.

(21) Appl. No.: 16/947,312

(22) Filed: Jul. 28, 2020

(65) Prior Publication Data
US 2022/0035000 A1     Feb. 3, 2022

(51) Int. Cl.
| | | |
|---|---|---|
| *G01S 7/40* | (2006.01) | |
| *G01S 13/86* | (2006.01) | |
| *A63B 69/00* | (2006.01) | |
| *G01S 13/42* | (2006.01) | |

(52) U.S. Cl.
CPC ........ *G01S 7/4008* (2013.01); *A63B 69/0002* (2013.01); *G01S 7/4021* (2013.01); *G01S 13/426* (2013.01); *G01S 13/867* (2013.01); *A63B 2220/806* (2013.01); *A63B 2220/89* (2013.01)

(58) Field of Classification Search
CPC .......... A63B 2220/806; A63B 2220/89; A63B 69/0002; G01S 13/426; G01S 13/72; G01S 13/867; G01S 7/40; G01S 7/4008; G01S 7/4021; G06T 2207/10028; G06T 2207/10048; G06T 2207/20132; G06T 2207/30208; G06T 2207/30224; G06T 2207/30241; G06T 2207/30244; G06T 7/292; G06T 7/80
See application file for complete search history.

(56) References Cited

U.S. PATENT DOCUMENTS

| | | |
|---|---|---|
| 7,113,885 B2 | 9/2006 | Krumm |
| 10,724,865 B1 | 7/2020 | Ferguson et al. |
| 10,732,262 B2 | 8/2020 | Ru et al. |

(Continued)

FOREIGN PATENT DOCUMENTS

| | | |
|---|---|---|
| JP | 2007-163258 | 6/2007 |
| WO | 2018/104844 | 6/2018 |

(Continued)

*Primary Examiner* — Timothy X Pham
(74) *Attorney, Agent, or Firm* — Fay Kaplun & Marcin, LLP

(57) ABSTRACT

A method includes generating an initial radar track using radar data and initial radar parameters and an initial camera track using image angular position data, initial camera parameters, and the radar range data in combination with calculating correction parameters to be applied to one of the radar data and the image data by comparing positions for the object from the initial radar track and the initial camera track, the first correction parameters being selected so that, when applied to the data from the other of the radar and the camera, to generate a first corrected track, a degree of correspondence between the first corrected track and the track of the other of the radar and camera is higher than a degree of correspondence between the initial radar track and the initial camera track.

14 Claims, 11 Drawing Sheets
(2 of 11 Drawing Sheet(s) Filed in Color)

(56) References Cited

U.S. PATENT DOCUMENTS

| | | |
|---|---|---|
| 2008/0300787 A1* | 12/2008 | Zeng ................... G01S 13/931 |
| | | 701/301 |
| 2014/0368651 A1 | 12/2014 | Irschara et al. |
| 2016/0187466 A1 | 6/2016 | Kim |
| 2016/0320476 A1 | 11/2016 | Johnson |
| 2018/0284220 A1 | 10/2018 | Bilik et al. |
| 2019/0072646 A1 | 3/2019 | Zeleny et al. |
| 2019/0111315 A2* | 4/2019 | Forsgren ............ A63B 24/0021 |
| 2019/0120955 A1 | 4/2019 | Zhong et al. |
| 2019/0293756 A1 | 9/2019 | Blaes et al. |
| 2019/0391254 A1* | 12/2019 | Asghar ................ G01S 13/723 |
| 2020/0005489 A1 | 1/2020 | Kroeger |
| 2020/0103236 A1 | 4/2020 | Adams et al. |
| 2021/0190936 A1* | 6/2021 | Sabripour ............. G06T 7/0002 |

FOREIGN PATENT DOCUMENTS

| | | |
|---|---|---|
| WO | 2019/039279 | 2/2019 |
| WO | 2019/097731 | 5/2019 |

* cited by examiner

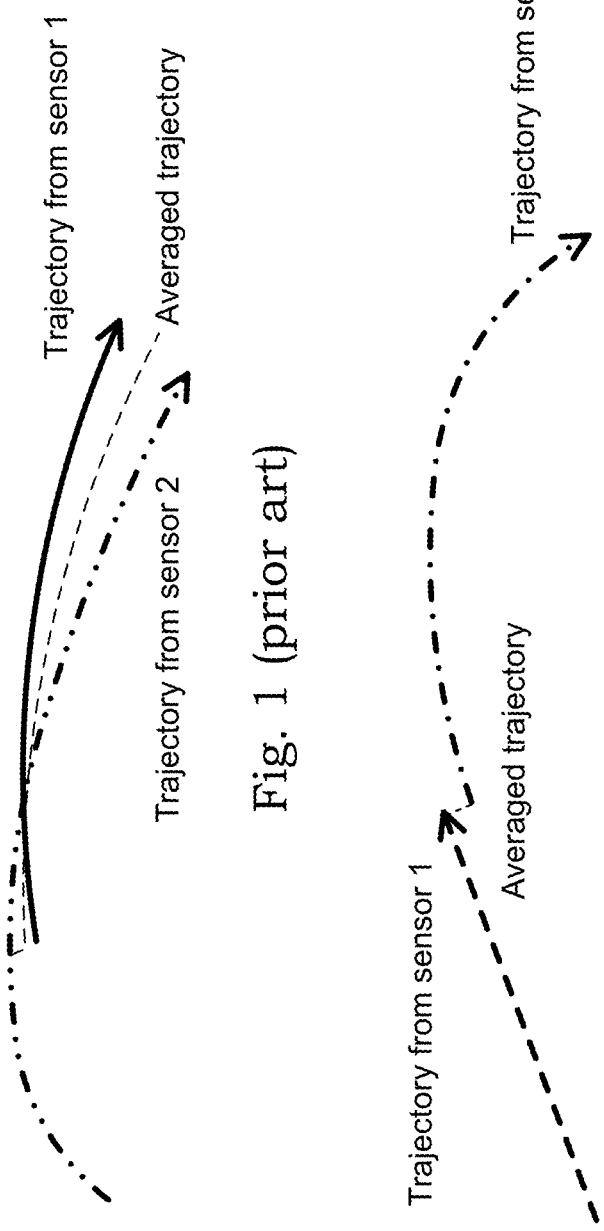

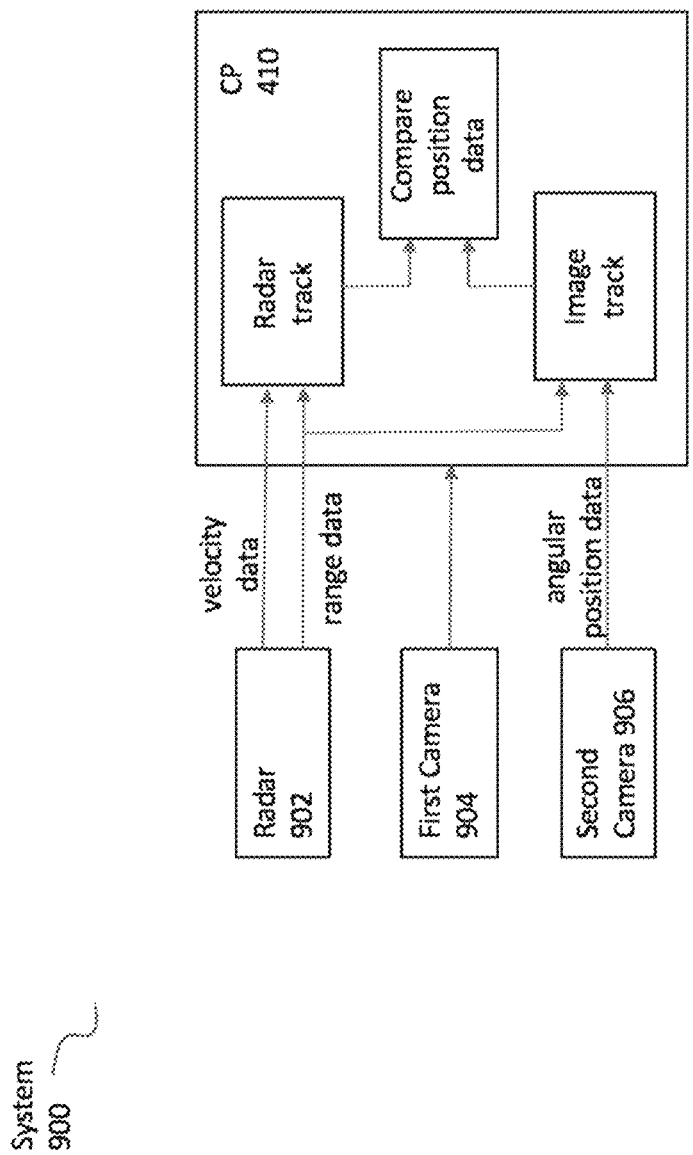

SYSTEM AND METHOD FOR INTER-SENSOR CALIBRATION

FIELD

The present disclosure relates to a system and a method for inter-sensor calibration. In particular, the present disclosure relates to systems and methods for near real-time inter-sensor calibration by tracking moving objects in situ.

BACKGROUND

Moving objects are typically tracked by a single sensor, but benefits arise when extending the setup to a multi-sensor tracking system. One benefit is that multiple sensors typically expand the capture volume of the tracking system; another is that multiple sensors may provide redundant measurements, which may improve accuracy and highlight outlier measurements. Furthermore, sensors of different types may be combined that complement one another. For instance, a camera sensor, providing high angular accuracy both horizontally and vertically, may suitably be combined with a radar, giving accurate measurements of range and range rate. In any case, all sensors must be calibrated to one another to achieve those benefits.

As an example of a multi-sensor tracking system, a golf ball tracking system may include one or more cameras or radars, a combination of cameras and radar, and other sensors tracking different and/or overlapping portions of the flight of a golf ball. Each of the sensors acquires object data made up of measurements of the ball at one or more times, in a coordinate system specific to the device and, when calibrated to one another, their data may be projected into a global coordinate system with a high degree of consistency for further processing and fusion of data.

Calibrating a sensor requires a determination of various parameters, both internal and external to the sensor. Internal parameters may comprise of a focal length, lens distortion parameters and a principal point for a camera, and phase offsets for a radar. External parameters typically constitute a sensor's position and orientation. Known methods for determining both sets of parameters are rigid, time consuming and manually intensive. Moreover, they typically fail to utilize the sensors in their natural setting, namely, here, when tracking moving objects. As such, known methods of calibration often cause downtime of the sensors.

In a first example of known methods for calibrating internal parameters, a camera sensor is manually placed in a fixture and directed at objects, typically one or more checkerboards, of known dimensions. Key features of the objects are pointed out in the image, either manually or automatically in software. A mathematical operation, obvious to those skilled in the art, is carried out that consequently calculates the internal parameters of the camera from the known object dimensions. In a second example, a radar is manually placed in a fixture and directed at one or more devices of known location relative to that of the radar. The devices, typically a transponder, may return a signal to the radar with a predefined and known Doppler shift. This knowledge in conjunction with the relative positions of the devices allows one skilled in the art to calculate the necessary phase offsets of each of the radar's receivers.

Known methods for calibrating external parameters proceed in a similar manner. In a first example, a GPS-rover or similar may be used to manually extract the 3D location of the sensor. In the event that the sensor is a camera, the GPS-rover may equally be used to determine the 3D coordinates of a number of fix points visible to the camera. The camera then identifies the fix points in its own coordinate system, either automatically or by one manually pointing them out in an image. Consequently, a mathematical operation is carried out to further estimate the orientation of the camera in the GPS coordinate system. In a second example, a lidar scanner extracts relative 3D coordinates of a system of sensors that have a straight line of sight to the scanner. The scanner may have to be moved to multiple locations and the data may be stitched together to extract the positions of the sensors relative to one another. Other means must be adopted to determine the orientations of the sensors. In a third example, an inclinometer coupled to a sensor is used to determine portions of the external parameters of the sensor, namely its tilt and roll, based on a previously determined orientation of the sensor relative to the inclinometer.

Sensor parameters are typically held constant once calibrated. However, factors such as, e.g., temperature or age may result in drift of sensor parameters over time. As an example, a radar fixed to the stands of a baseball stadium and configured to track baseballs in flight may both translate and rotate as the stand onto which the radar is mounted is loaded with fans. Sensor parameters that drift necessitate repeated calibrations, however such calibrations may be cumbersome when the sensor is difficult to access and the calibration process requires manual intervention. Repeated calibrations may further be highly impractical if the calibration process causes downtime of the sensor from its normal operation.

When the sensors of a multi-sensor system are inaccurately calibrated with respect to one another fusing data from the sensors may deteriorate the quality of the delivered data. In a first example, when two or more sensors monitor the same moving object at overlapping times, differences between the measurements from the various sensors may be addressed, for example, by a simple averaging, a weighted averaging, a Kalman filter, or other known mathematical approaches. FIG. 1 shows an example of inconsistent tracking data from two sensors producing an unphysical trajectory of an object at the beginning of the overlap region when the trajectories are averaged, albeit naively. In a second example, when two or more sensors measure the same moving object without overlap in time, their measurements may result in discontinuities at the point of transition between the sensors. FIG. 2 shows an example of inconsistent tracking data producing a discontinuous trajectory at the point where the object transitions from the field of view of one sensor to the field of view of the other sensor. The discontinuity of the final trajectory could for instance be lessened by smoothing a Kalman filter on the data instead, but the misaligned data would nonetheless still degrade the quality of the final trajectory.

SUMMARY

The present disclosure relates to a method which includes capturing radar data with a radar and image data with a camera in a multi-sensor tracking system, the radar and image data corresponding to a path of an object, the radar data including radar range data and radar velocity data for the object and the camera data including image angular position data for the object; generating an initial radar track using the radar data and initial radar parameters; generating an initial camera track using the image angular position data, initial camera parameters, and the radar range data; and calculating one of: first correction parameters to be applied to the radar data by comparing positions for the object from the initial radar track and the initial camera track wherein, the first correction parameters are selected so that, when applied to the radar data to generate a first corrected track, a degree of correspondence between the first corrected track and the initial camera track is higher than a degree of correspondence between the initial radar track and the initial camera track; and second correction parameters to be applied to the image angular position data by comparing positions for the object from the initial radar track and the initial camera track wherein, the second correction parameters are selected so that, when applied to the image angular position data to generate a second corrected track, a degree of correspondence between the second corrected track and the initial radar track is higher than a degree of correspondence between the initial radar track and the initial camera track.

In an embodiment, the method further includes calibrating either the radar with the first correction parameters or the camera with the second correction parameters.

In an embodiment, the first correction parameters comprise an optimized orientation of the radar and wherein the second correction parameters comprise an optimized orientation of the camera, the method further comprising: determining one of a tilt adjustment and a pan adjustment to the initial radar parameters to calibrate the radar to a corrected orientation based on the first correction parameters and a tilt adjustment and a pan adjustment to the initial camera parameters to calibrate the camera to a corrected orientation based on the second correction parameters.

In an embodiment, the method further includes fitting a polynomial to the initial radar track; and evaluating the polynomial at a series of time points corresponding to times at which image data was acquired to determine a radar position corresponding to each time point in the series.

In an embodiment, the method further includes determining a series of tilt and pan adjustments to one of the radar and the camera by comparing the polynomial and the camera track at each of the time points in the series; determining a median for the series of tilt and pan adjustments as median tilt and pan adjustments; and low pass filtering the median tilt and pan adjustments.

In an embodiment, the initial radar track is represented by a state vector and a dynamical model, the state vector representing path parameters of the object and the dynamical model accounting for lift and drag on the object.

In an embodiment, the radar range measurement is used to expand the image angular position data to 3D coordinates.

In an embodiment, the multi-sensor tracking system is implemented at a baseball field and the object is a baseball.

The present disclosure also relates to a system which includes a central processing arrangement in communication with a radar and a camera in a multi-sensor tracking system, the central processing arrangement receiving radar data from the radar and camera data from the camera corresponding to a path of an object, the radar data including radar range data and radar velocity data for the object and the camera data including image angular position data for the object, the central processing arrangement generating an initial radar track using the radar data and initial radar parameters, the central processing arrangement generating an initial camera track using the image angular position data, initial camera parameters, and the radar range data, and the central processing arrangement calculating one of: first correction parameters to be applied to the radar data by comparing positions for the object from the initial radar track and the initial camera track wherein, the first correction parameters are selected so that, when applied to the radar data to generate a first corrected track, a degree of correspondence between the first corrected track and the initial camera track is higher than a degree of correspondence between the initial radar track and the initial camera track; and second correction parameters to be applied to the image angular position data by comparing positions for the object from the initial radar track and the initial camera track wherein, the second correction parameters are selected so that, when applied to the image angular position data to generate a second corrected track, a degree of correspondence between the second corrected track and the initial radar track is higher than a degree of correspondence between the initial radar track and the initial camera track.

In an embodiment, the first correction parameters comprise an optimized orientation of the radar and wherein the second correction parameters comprise an optimized orientation of the camera, wherein the central processing arrangement determines one of a tilt adjustment and a pan adjustment to the initial radar parameters to calibrate the radar to a corrected orientation based on the first correction parameters and a tilt adjustment and a pan adjustment to the initial camera parameters to calibrate the camera to a corrected orientation based on the second correction parameters.

In an embodiment, the central processing arrangement fits a polynomial to the initial radar track and evaluates the polynomial at a series of time points corresponding to times at which image data was acquired to determine a radar position corresponding to each time point in the series.

In an embodiment, the central processing arrangement determines a series of tilt and pan adjustments to one of the radar and the camera by comparing the polynomial and the camera track at each of the time points in the series and determines a median for the series of tilt and pan adjustments as median tilt and pan adjustments, the system further comprising a low pass filtering arrangement filtering the median tilt and pan adjustments.

In an embodiment, the central processing arrangement represents the initial radar track as a state vector and a dynamical model, the state vector representing path parameters of the object and the dynamical model accounting for lift and drag on the object.

In addition, the present disclosure relates to a method capturing first sensor data with a first sensor and second sensor data with a second sensor in a multi-sensor tracking system, the first and second sensor data corresponding to a path of an object; generating an initial first track using the first sensor data and initial first sensor parameters; generating an initial second track using the second sensor data and at least one aspect of the first sensor data, where the at least one aspect of the first sensor data is used to expand the second sensor data into a three-dimensional space; and calculating one of: first correction parameters to be applied to the first sensor data by comparing positions for the object from the initial first track and the initial second track wherein, the first correction parameters are selected so that, when applied to the first sensor data to generate a first corrected track, a degree of correspondence between the first corrected track and the initial second track is higher than a degree of correspondence between the initial first track and the initial second track; and second correction parameters to be applied to the second sensor data by comparing positions for the object from the initial first track and the initial second track wherein, the second correction parameters are selected so that, when applied to the second sensor data to generate a second corrected track, a degree of correspondence between the second corrected track and the initial first track is higher than a degree of correspondence between the initial first track and the initial second track.

BRIEF DESCRIPTION

The patent or application file contains at least one drawing executed in color. Copies of this patent or patent application publication with color drawing(s) will be provided by the U.S. Patent and Trademark Office upon request and payment of the necessary fee.

FIG. 1 shows a first example of inconsistent data from two sensors producing a discontinuous track of an object according to prior methods.

FIG. 2 shows a second example of inconsistent data from two sensors producing a discontinuous trajectory of an object according to prior methods.

FIG. 9 shows a system comprising a radar and two cameras for tracking object trajectories such as baseball pitches and/or other baseball trajectories

DETAILED DESCRIPTION

Figure 3:
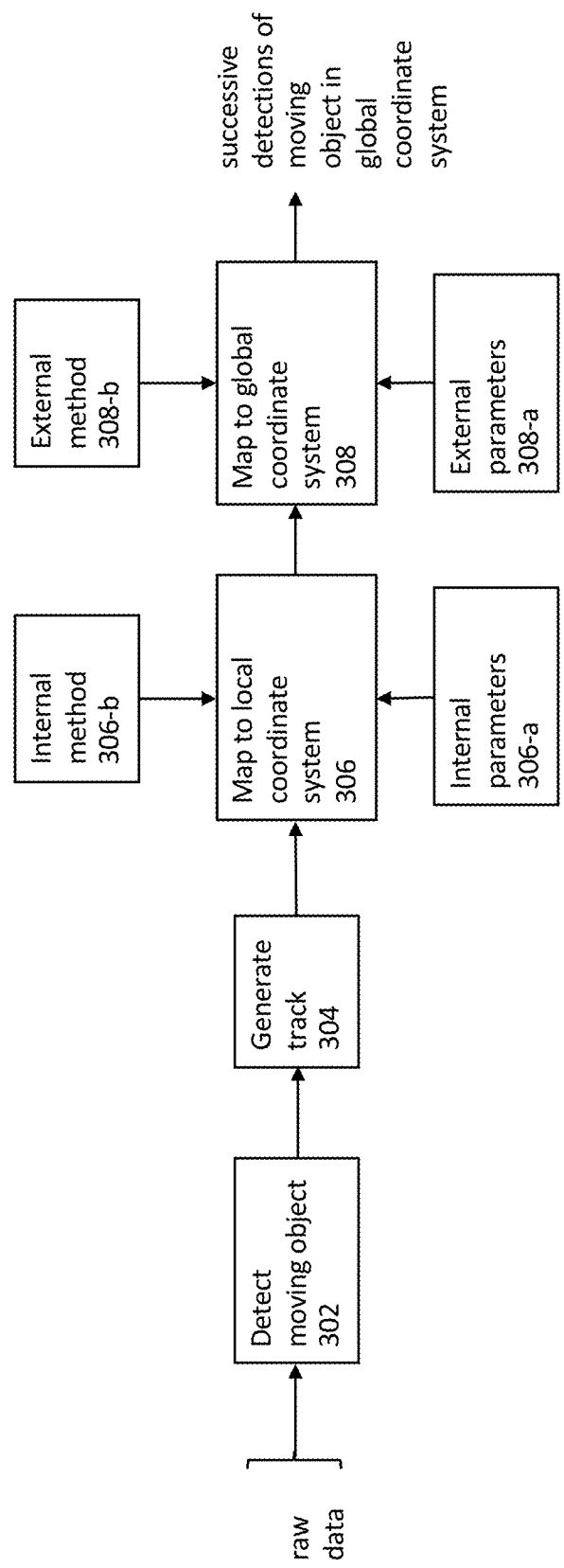
FIG. 3 shows an exemplary method for converting raw sensor data into a track of a moving object in a global coordinate system.

The exemplary embodiments describe a learning system that automatically and adaptively determines some or all of the internal and external sensor parameters of one or more sensors in a multi-sensor system such that consistent and more accurate tracking data of sensed moving objects may be produced. The parameters are determined in situ and in near real time, without the need for manual intervention, and without downtime of the sensors from their normal operation.

During normal operation of the multi-sensor system, the sensors are configured to track moving objects. In one example, the multi-sensor system may be any number of cameras and radars situated at a golf course and configured to track golf balls in flight. The sensors produce redundant data when tracking the same moving object, and it is this redundant data that may be used to calibrate the internal and external parameters of one or more sensors to one another to produce consistent and more accurate tracking data.

The system consists of multiple sensors, each sensor feeding raw data to a tracking unit, which in turn communicates with a central processing arrangement ("CP"). The sensors serve to capture data of the moving objects of interest. The sensors may be a pulse, Doppler, CW, FMCW or MFCW radar, a visible or infrared camera, a lidar, an inertial measurement unit, etc., or any combination thereof.

Internal parameters of a sensor may be generally defined as parameters relating to the internal workings of the sensor. Examples may be a focal length, lens distortion parameters and a principal point for a camera; phase offsets and antenna radiation patterns for a radar; internal clock offsets for sensors in general, etc. When the internal parameters of a sensor are known with a high degree of accuracy the data received by the sensor may be processed to produce an output with a high degree of accuracy.

External parameters of a sensor typically constitute the position and orientation of the sensor with respect to a global coordinate system. Knowledge of the external parameters of a sensor allows one to map measured data from the coordinate system of the sensor to that of the global coordinate system, such that it may be compared with data from other sensors.

The tracking units, as defined here, serve to detect in the raw sensor data the moving objects of interest, and, where possible, to piece together successive detections of the same moving object into "tracks". A track is therefore one or more detections of a moving object at successive times. For example, a camera may capture a number of consecutive images from a golf course. Its tracking unit may consequently extract the pixel location of e.g. a golf ball in each image, and the pixel locations of the golf ball in consecutive images are concatenated into a track of pixel locations in the local coordinate system of the camera.

A tracking unit may be an entity physically separate from the sensors and the CP, or alternatively an entity embedded in the sensor or integrated with the CP. A tracking unit will have an internal processing arrangement programmed to detect moving objects in the raw sensor data and to generate tracks of the detected moving objects, and will further have a memory storing the internal and external parameters of its sensor. The tracking unit may have compensated the raw sensor data for the internal parameters of the sensor to aid in tracking. For example, a tracking unit may scale and undistort the raw images from a camera before extracting pixel locations of the moving object of interest. In the event that a sensor is mobile, such as e.g. a camera affixed to a station that slides and/or rotates, and where this movement is internally monitored by components of the sensor, additional sensors mounted to the sensor, e.g., an inertial navigation system, or through image analysis, as would be understood by those skilled in the art, this information may equally be made available to the tracking unit to aid in piecing together measurements into tracks.

A tracking unit may furthermore have been guided in its tracking by the CP, which has knowledge of tracks originating from other sensors. For instance, on a driving range in which multiple cameras track golf balls in flight, one tracking unit may have detected a golf ball in flight in the raw image of its camera, which may be communicated to the CP. The CP in turn projects the detected golf ball into the images of the other cameras, through knowledge of the internal and external parameters of each camera as would be evident to those skilled in the art, such that their tracking units may search for the same golf ball in a suitable neighborhood around the projected point in their respective images.

Each one of multiple sensors measures objects in a coordinate system local to the given sensor. The sensors may measure not only from different perspectives but in different spaces. For instance, a camera sensor may measure two-dimensional pixel locations of an object in a series of images, while a radar sensor may measure in a 4-dimensional space comprising a three-dimensional position as well as a radial velocity of the object.

The CP serves to match tracks across sensors in a global coordinate system, as will be described later; to optimize sensor parameters such that matched tracks agree in a user-defined optimal manner; and to fuse matched tracks with optimized sensor parameters so that accurate data may be provided as output.

FIG. 3 shows an exemplary method for converting raw sensor data into a track of a moving object in a global coordinate system. In one embodiment, the sensor is a camera. In 302, the camera captures as raw data a series of images containing a moving object and detects a pixel location of the moving object in each of the images. In 304, the multiple, successive detections of the moving object are pieced together into a track. In 306, each pixel in the track is converted to normalized camera coordinates by supplying to the process the internal parameters (306-a) of the camera as well as the appropriate method (306-b) for carrying out the conversion, as would be known to those skilled in the art. Finally, in 308, each of the normalized camera coordinates in the track are mapped to a global coordinate system by supplying the external parameters (308-a) of the camera as well as the appropriate mathematical operation needed to perform the mapping (308-b). For a camera, the final output is a succession of rays in a global coordinates system locating a moving object of interest.

Figure 4:
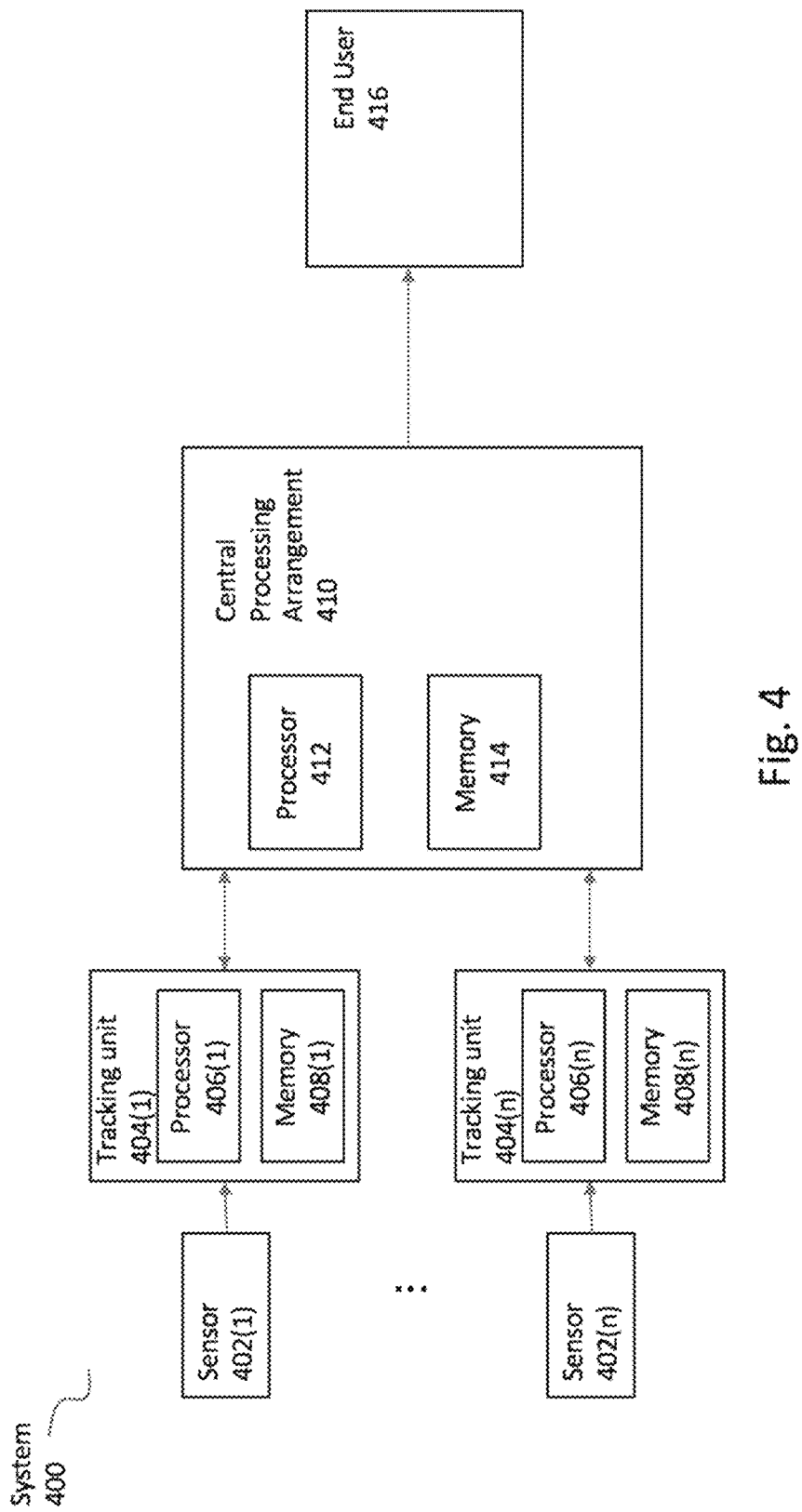
FIG. 4 shows an exemplary system for calibrating sensors in a multi-sensor tracking arrangement.

FIG. 4 shows an exemplary system 400 for calibrating sensors in a multi-sensor tracking arrangement. The system includes a plurality of sensors 402 (i.e., sensors 402(1)-402(n)), a plurality of tracking units 404 (i.e., tracking units 404(1)-404(n)), and a central processing arrangement (CP) 140. In other words, the system 400 may include any number of sensors 402 feeding raw data to tracking units 404, which in turn communicate with a single CP 410. The sensors 402 may be any sensors configured to track movement (of, e.g., objects or people), e.g., a radar array, a camera, a lidar, etc. The sensors 402 may be fixed at a location or may be mobile. The tracking units 404 may each have an internal processor 406 and memory 408 configured to perform calculations on raw sensor data and output tracks to the CP 410 corresponding to successive measurements and detections of moving objects in the raw sensor data. Sensor parameters, stored in memory 408, may additionally be passed from the tracking units 404 to the CP 410. Alternately, as discussed above, one or more of the tracking units 404 may be implemented at the CP 410.

The CP 410 includes a processor 412 and a storage 414. The CP 410 is coupled to the sensors 402 through their tracking units 404, and is configured to receive tracks and sensor parameters from and send guidance to the tracking units 404. The CP 410 may further be configured to output data to an end user 416. The end user 416 may be, for example, a display or a further processing apparatus. The processor 412 of the CP 410 may include a plurality of processors; in some embodiments, the CP 410 may process the tracks of dozens or hundreds of objects simultaneously, which would require a relatively high computing power. The CP 410 has executable instructions stored thereon for performing tracking-related calculations. For example, the CP 410 may match tracking data received from the sensors, perform the inter-sensor calibration process, and fuse the tracking data for outputting object tracks to the end user.

The parameters of sensors 402 may have been calibrated at an earlier time, with their parameters stored in memory 408 of the tracking units. The existing calibration may have been from a factory calibration of the sensors or from a previous run of the inter-sensor calibration procedure outlined herein.

Figure 5:
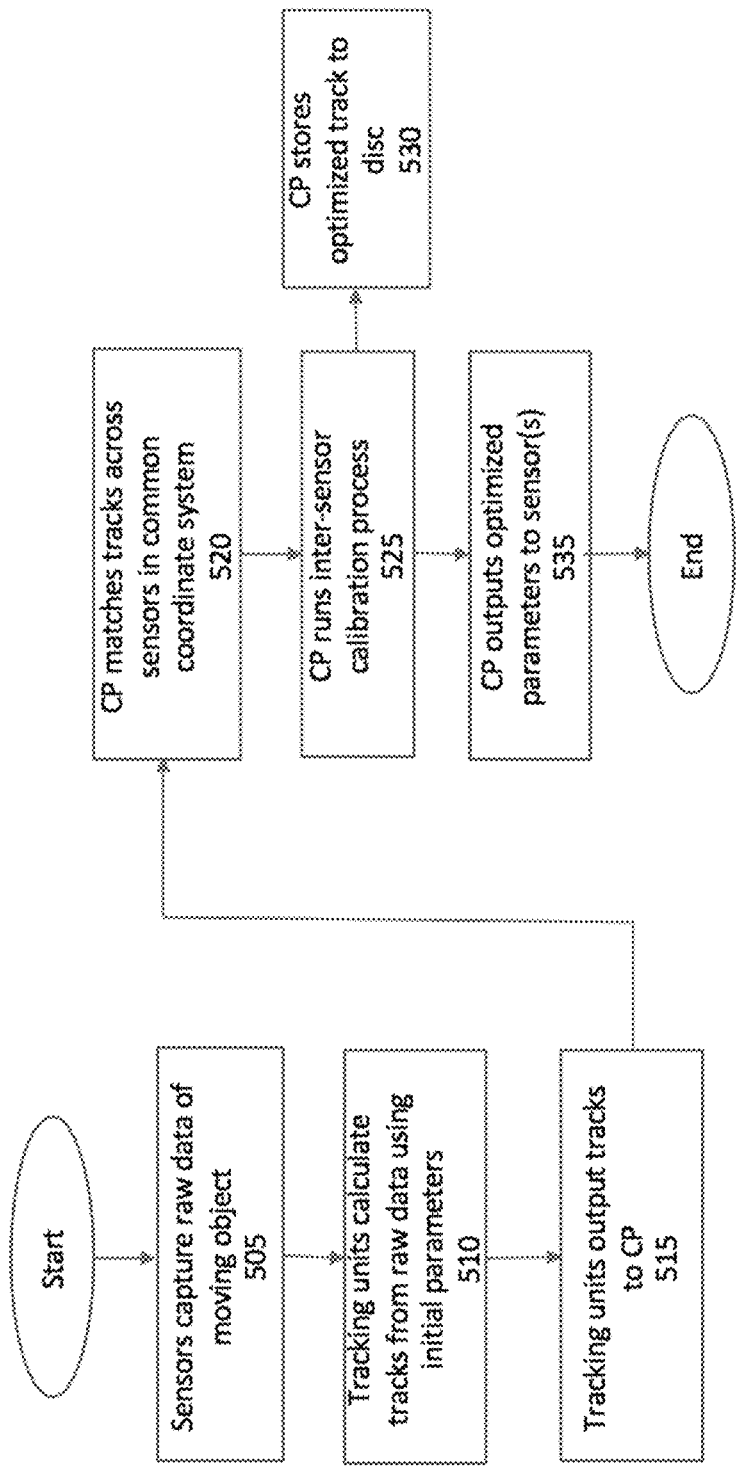
FIG. 5 shows an exemplary method for calibrating sensors in a multi-sensor system.

FIG. 5 shows an exemplary method 500 for calibrating sensors 402—once—in a multi-sensor system. The calibration is notably carried out during normal operation of each of the sensors.

As discussed previously, a set of existing parameters may be stored for each of the sensors 402 in memory 408. Any of a variety of means known in the art may have been used for determining these parameters including the exemplary calibration procedure to be explained in detail below.

In 505, the sensors 402 capture raw data corresponding to at least one moving object. The sensors 402 may be deployed at or around the tracking location to track multiple moving objects simultaneously, such as, e.g., golf balls at a driving range. However, only one moving object need be tracked to perform the exemplary calibration procedure.

In 510, the tracking units 404 of each sensor 402 individually determine tracks for the portion of the object motion that the sensor 402 has generated the raw data for. The tracks are determined by performing calculations on the raw data, potentially using the existing sensor parameters retrieved from memory 408. It is not a requirement that the tracks from the tracking units 404 overlap in time, even partially. For example, a first sensor 402(1) may measure the beginning of a track, while a second sensor 402(2) measures a later portion. A dynamical model relevant for the object (e.g., Newton's second law and knowledge of the aerodynamic properties of the moving object) allows the CP 410 or other processor to extrapolate the tracks both forward and backward in time to increase the amount of overlap such that the two tracks may be more easily compared with one another as would be understood by those skilled in the art.

In 515, each tracking unit 404 outputs to the CP 510 the respective tracks it determined in 510 along with sensor parameters stored in memory 408.

In 520, the CP 410 matches tracks across sensors 402 in a global coordinate system. The process of converting from raw data to data in a global coordinate system was outlined in FIG. 3. The tracks are matched by identifying unique characteristics exhibited by each track. Such characteristics may be, e.g., synchronization of object positions and times; object velocity; spin rate; spin axis; location and timing of object bounces; the object's color or reflection coefficient; etc. Not all tracks may be matched across sensors. For example, a portion of the motion of a first object may be obscured by an intervening structure or the motion of a second object from the perspective of one of the sensors 402, such that the sensor 402 fails to capture data from and generate a track for a first object at a given time. Moreover, some tracks may be matched for some sensors while other tracks may be matched for other sensors. As noted previously, the tracks may be extrapolated forward and/or back in time to better compare the tracks. The CP 410 having knowledge of the existing parameters of the sensors allows the CP 410 to project the tracks (generated in sensor coordinate systems) into a global coordinate system with a global clock.

Once matched, in 525, the CP 410 runs an inter-sensor calibration process, to be explained in detail below. The inter-sensor calibration process adjusts internal and external parameters of one or more of the sensors 402 so that sensor tracks agree in an optimal manner in a global coordinate system. In optional 530, the sensor tracks are stored to memory 414 for use in future calibration processes, to be explained in detail below.

In 535, the optimized parameters are returned to the tracking units 404 of each sensor 402. Each tracking unit 404 may update its existing parameters stored on memory 408 with the optimized parameters and use the updated parameters for future tracking. In this way, the sensors 402 are calibrated to generate consistent tracking data when the individual tracks are fused in the CP 410. For future tracks (until any further adjustment is necessary), the CP 410 need not perform calculations to make the received tracks consistent, as the tracks should already be consistent given the calibrated parameters. The CP 410 can simply fuse the tracks in a global coordinate system and output the combined track to the end user 416.

Figure 6:
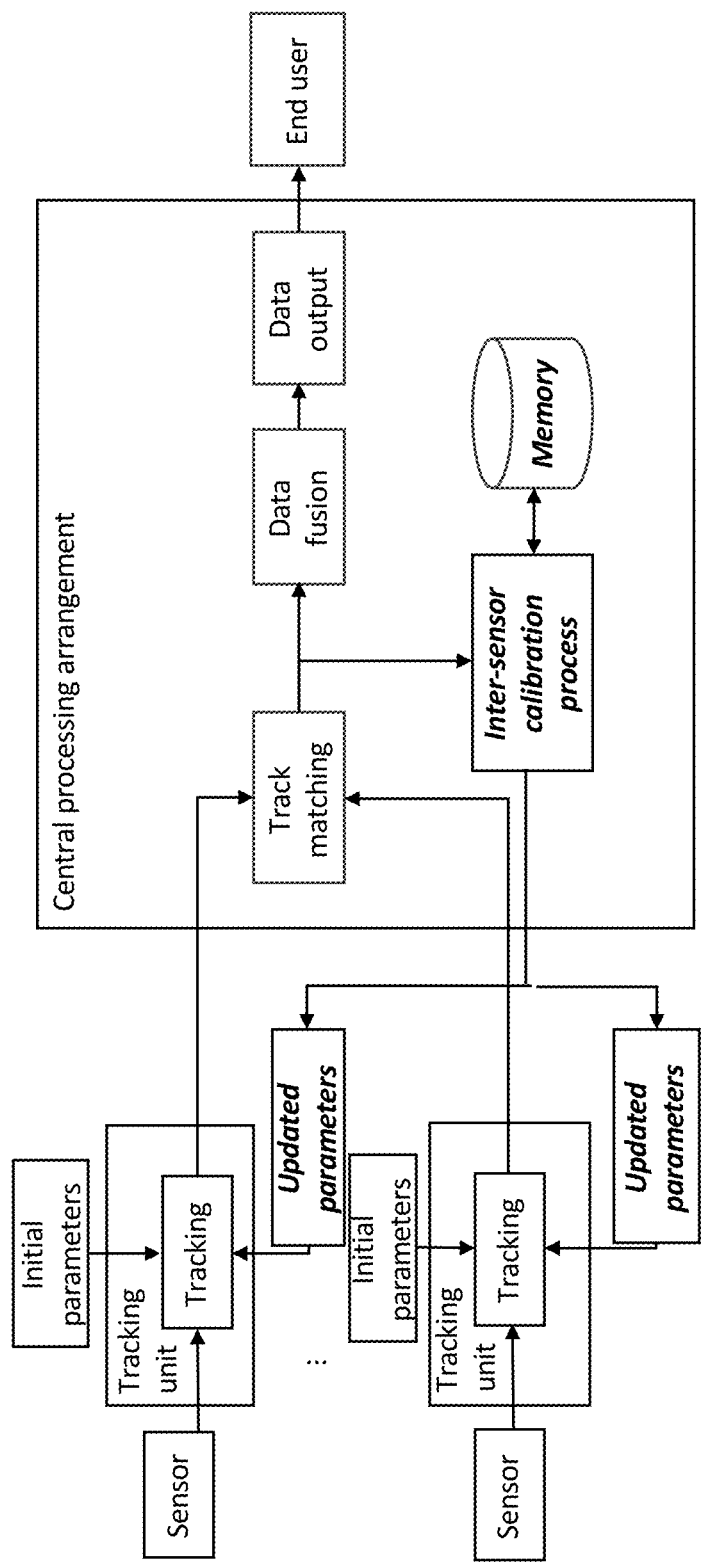
FIG. 6 shows the system of FIG. 4 with exemplary data flows and processing steps.

FIG. 6 shows the manner in which the inter-sensor calibration process and its feedback is integrated into the normal operation of the multi-sensor system. During normal operation, the sensors capture raw data from which moving objects are detected by tracking units. Tracks of moving objects may consequently be matched and fused before being outputted to an end user.

The inter-sensor calibration process may be implemented in parallel such that no sensor downtime is necessary. The inter-sensor calibration process may be run, and optimized parameters may be returned to their respective tracking units for future tracking.

The inter-sensor calibration process determines internal and external parameters of the sensors 402 such that the tracks generated by the tracking units 404 agree spatially and/or temporally in an optimal way in a global coordinate system.

Optimality may be user-defined. In one embodiment, optimality will constitute minimizing the weighted 3d-positional residuals between tracks. Algorithmically, one typically defines a cost function, E, to be minimized. When minimizing positional residuals, this cost function could look as follows for a single matched track, t:

$$E_{track\ t} = \sum_{sensor\ i} \left( \sum_{sensor\ j \neq sensor\ i} \left( \sum_{position\ n_t} \left( \|x_i^{n_t} - x_j^{n_t}\|_{W_{ij}^{n_t}} \right) \right) \right).$$

In the above function, $x_i^{n_t}$ is an estimate of the nth position of an object in a global coordinate system belonging to track t, which has been detected or estimated by the tracking unit associated with sensor i and which is a function of the latest estimate for sensor i's internal and external parameters.

$$\|\cdot\|_{W_{ij}^{n_t}}$$

represents the weighted 2-norm of its argument under some user-defined weight matrix $W_{ij}^{n_t}$.

Data from a given sensor 402 may have qualities that lend the data a high degree of confidence, while other data from other sensors 402 may have qualities indicating a low degree of confidence. Where high quality data may be compared with other high-quality data, greater weight is placed, which may be reflected in weight matrix $W_{ij}^{n_t}$. If all data is of equal weight, the weight matrix may be set to the identity matrix. Examples of measurements with low confidence are, e.g., measurements that are noisy; measurements outside the "space" of the sensor, for instance the depth of an object in an image; or measurements that have been arrived at by extrapolating a dynamical model.

In another embodiment, the cost function to be minimized may be a function of the residuals in velocity, spin axis, accelerations, pixels, pixel intensities, etc. or any weighted combination thereof. As an example, a multi-sensor system may consist of a radar and a camera detecting a moving object, say a golf ball. Ball positions, as detected by the radar, may be projected into the image plane of the camera, and a cost function may be defined that minimizes residuals in pixel coordinates between that of the camera and that of the radar's projection. In another example, two cameras may track a baseball in flight that travels across a volume where the lighting changes, such that the ball becomes increasingly dark as viewed by each camera. The difference in pixel intensity monitored by each camera may additionally be incorporated into the cost function, such that the cost function to be minimized could be a function of not only pixel coordinates but also pixel intensities. In still another example, in a sensor arrangement with a camera and a radar, pixel locations detected in the image plane of the camera may be expanded into a 3D Euclidean space using radar range measurements of the ball positions as detected by the radar, and defining a cost function that minimizes residuals in this space In the event that multiple tracks have been matched by the CP, the cost function may be written as a weighted sum of costs of each track, i.e.:

$$E = \sum_{tracks\ t} w_t \times E_{track\ t}$$

where $w_t$ is the weight assigned to each track t. By default, the weights assigned to each track may be assumed to be identical, i.e., $w_t=1$.

Arriving at optimality, namely minimizing E, may be done numerically and may be carried out by the CP. In its simplest form, the CP may do a brute-force grid search across all parameters—internal and external—for all sensors and select the parameters that minimize the cost function. This may equally be done by sampling a small grid around an intelligent guess for all parameters, if such an intelligent guess exists. In another embodiment, intelligent optimization techniques may be utilized. Examples of such techniques are the Nelder-Mead algorithm and—where derivatives of the cost function may be evaluated—the Gauss-Newton algorithm, the Levenberg-Marquardt algorithm, or other gradient descent-based algorithms. After the cost function E is minimized and the optimized internal and external parameters are determined the optimized parameters may be returned to each sensor for future tracking.

Depending on the nature of the multi-sensor system and user preferences the inter-sensor calibration process may be implemented in a variety of ways. In one embodiment, inter-sensor calibration is carried out once, say at installation, after which the internal and external parameters are considered calibrated and constant in time. One or more tracks may be collected and stored to disc during installation, after which the inter-sensor calibration routine may be run.

In another embodiment, the inter-sensor calibration process may be run continuously, such that the internal and external parameters of each sensor are continuously updated for each newly identified track or tracks. The newly identified track or tracks may be appended to a list of some or all historically identified tracks, retrieved from memory, and inter-sensor calibration may be run.

In still another embodiment, a newly identified track or tracks may be appended to a list of some or all historically identified tracks, retrieved from memory, and inter-sensor calibration may be run. In this embodiment, however, the internal and external parameters of some or all sensors may be assumed to have drifted in time during the collection of tracks. To account for this, the tracks may be weighted exponentially in time such that more recently identified tracks may be given greater weight during the inter-sensor calibration process. Such a weight function could take the form $w_t = e^{-\lambda \Delta \tau}$, where $\Delta \tau$ is the time in seconds since the track was observed and $\lambda$ is a user-defined decay-rate constant.

In still another embodiment, the aforementioned drift of some or all sensors is monitored by one or more means, for instance an inertial motion unit (IMU) built into the sensor. The measured drift may be accounted for by the CP during the optimization step of inter-sensor calibration, such that tracks again with benefit may be given equal weight in the cost function to be minimized, i.e., $w_t = 1$.

In still another embodiment, there may not be time and/or resources to do a full run of the inter-sensor calibration of all tracks, both new and from memory. There may simply be too many tracks, on the order of millions. Instead, one may adopt a stochastic or mini-batch gradient descent approach as is known to those skilled in the art. Upon receiving a newly identified track or tracks, the CP 410 may first store the most recent set of parameter values for all sensors as $\text{param}_{k-1}$. Next, the CP 410 may calculate the optimal set of parameter values based on the newly received track or tracks by running the inter-sensor calibration on just that track or those tracks. This set of parameter values is stored as $\text{param}_k$. Lastly, the CP 410 approximates the optimal set of parameter values for each sensor as a weighted sum of the above, i.e., $w \times \text{param}_k + (1-w) \times \text{param}_{k-1}$, where $0 \le w \le 1$ is a used-defined weight. Heuristics for setting user-defined w will be known to those skilled in the art.

In all cases, the updated values of all internal and external sensor parameters may be sent to the tracking unit of each sensor for future tracking.

The inter-sensor calibration process may be set up such that any one or more sensor parameters of any particular sensor are optimized. In other words, not all sensor parameters need to be optimized. As a first example, in a venue which is a golf driving range onto which multiple radars are mounted, it may be that only the pan angle of each radar is chosen to be optimized through the inter-sensor calibration process, while all remaining internal and external sensor parameters are arrived at by other means. Restricting optimization to some but not all parameters of a sensor is equivalent to performing a constrained optimization, which may be familiar to those skilled in the art.

The inter-sensor calibration may be implemented in a variety of settings. For example, the process may be run at venues where multiple sensors, similar or not, are required to capture the entire volume in which a moving object may move. At venues such as a golf driving range, a hole on a golf course, a baseball stadium, a football stadium, or any other stadium, the multiple sensors may track sports balls or ball-like objects and combine tracking data across the many sensors to output a single track to, e.g., a broadcast display. These venues may also require precision measurements, where sufficient overlap between sensors is required for redundant measurements. Minimizing the variance of the combined measurements and rejecting outliers may enhance the precision of the system.

Some venues may utilize a reference sensor delivering a categorical output to which one or more sensors must be calibrated. For example, in baseball, the reference sensor may be a human, i.e., the umpire, and the output is the call of the pitch, i.e., a strike or a ball. One or more second sensors may capture the trajectory of the ball during the pitch. The parameters of the second sensors may thus be updated such that calls proposed by the second sensors correlate well with that of the reference sensor, here the umpire.

Still other venues may combine sensors that measure a full trajectory of an object with sensors that measure only parts of the trajectory. The full-trajectory sensors may measure the object with less accuracy than the part-trajectory sensors. An example of such a system is adding a high-precision golf launch monitor to a driving range onto which sensors already exist that measure the full trajectory of the ball. By calibrating the external parameters of the launch monitor such that it aligns with the sensors already installed on the range, detailed data may be given on a shot, both at impact as well as throughout its flight. The high precision golf launch monitor may be a portable unit, which is set up by the golfer himself. This method of calibration of the portable golf launch monitor could then be done automatically without any operations from the golfer's side.

Still other venues may implement multiple sensors that have not yet been time synchronized. One example of such is two sensors tracking the trajectory of a baseball pitch, one correctly in time and another offset by some $\Delta t$. After having matched the two tracks in the CP, inter-sensor calibration may be carried out that attempts to minimize e.g. the positional residuals between the two tracks by offsetting the track in the second sensor by $-\Delta t$.

In another embodiment, an inertial measurement unit (IMU) is mounted onto e.g. a golf club and is used in conjunction with a radar and/or camera tracking the swing of the club. The IMU captures parameters of the club, say its velocity and orientation, during the swing of the club. By comparing with similar measurements from the radar and/or camera the position and orientation of the IMU may be determined. Other examples onto which the IMU may be mounted may be a tennis racket, a baseball bat, a cricket bat, etc.

In another embodiment, to be described in detail below, a calibration approach is used that utilizes a more heuristic approach than the norm-based approach described above. This embodiment may be particularly applicable to a stadium setting, e.g. a baseball stadium. The calibration process for this embodiment is described relative to tracking thrown pitches, however those of skill in the art will understand that the exemplary calibration process may also be used in other settings and for other purposes for tracking other thrown or batted balls in a baseball stadium or other sports balls in any other settings.

FIG. 9 shows a system 900 comprising a radar 902 and two cameras 904, 906 for tracking object trajectories such as baseball pitches and/or other baseball trajectories. The first camera 904 has a wide aperture and may be referred to as the wide camera, while the second camera 906 has a narrow aperture and may be referred to as the narrow camera. The radar 902 and two cameras 904, 906 may, in this embodiment, be mounted onto a same structure, such as a tracking unit, and oriented to have overlapping fields of view (FOVs), i.e., with the main beam of the radar antenna covering a same FOV as the cameras 904, 906 or a portion of the FOV's of the cameras 904, 906.

However, in other embodiments, the radar 902 and one or more of the cameras 904, 906 may be mounted separately and have less overlap between their FOVs. The first camera 904 may be considered the primary sensor for field calibration purposes, e.g. calibrating external parameters and, in this embodiment, has an FOV covering the entire field of play. The second camera 906, while having an FOV similar to that of the first camera 904, captures images that are later cropped to include an area such as e.g. the pitcher's mound, the batter's box, and the surrounding areas, for tracking purposes. This also allows for increased flexibility during installation, as the second camera 906 need not be precisely oriented. However, uncropped or differently cropped images may also be used. The frame rate of the first camera 904 may be e.g. 30 fps and the frame rate of the second camera 906 may be e.g. 60 fps. The external parameters of the first (wide) camera 904 are determined as the first step in the initial calibration process, and afterward the external parameters of the second (narrow) camera 906 are determined relative to the first camera 904.

In one embodiment, to be explained in detail below, external parameters for the radar 902 are determined by inter-sensor calibration based on ball detections in the radar 902 and the narrow camera 906 only. However, in other embodiments, the radar parameters may be determined based on ball detections in the wide camera 904 as well. The sensors in the system 900 are time synchronized, so that a measurement captured at a given time by one of the sensors may be directly compared to a measurement captured at the same time (or at a closest available time) by one of the other sensors or to an interpolated value between the two closest available times as would be understood by those skilled in the art.

A central processing arrangement, such as the CP 410 described above, may be used to perform the object tracking and calibration calculations. It is noted that a live calibration system may be run alongside the inter-sensor calibration process described below, the live calibration system detecting home plate in the narrow camera and adjusting a baseline calibration based on these detections. Those skilled in the art will understand that the live calibration system may rely on any other feature or fixed features on the field or in the stadium especially as home plate is often obscured by players, umpires, etc. The live calibration system may, based on detections of home plate or other predetermined features, adjust a baseline calibration may adjust a baseline calibration based on feature matching in either the narrow or wide camera.

Figure 10:
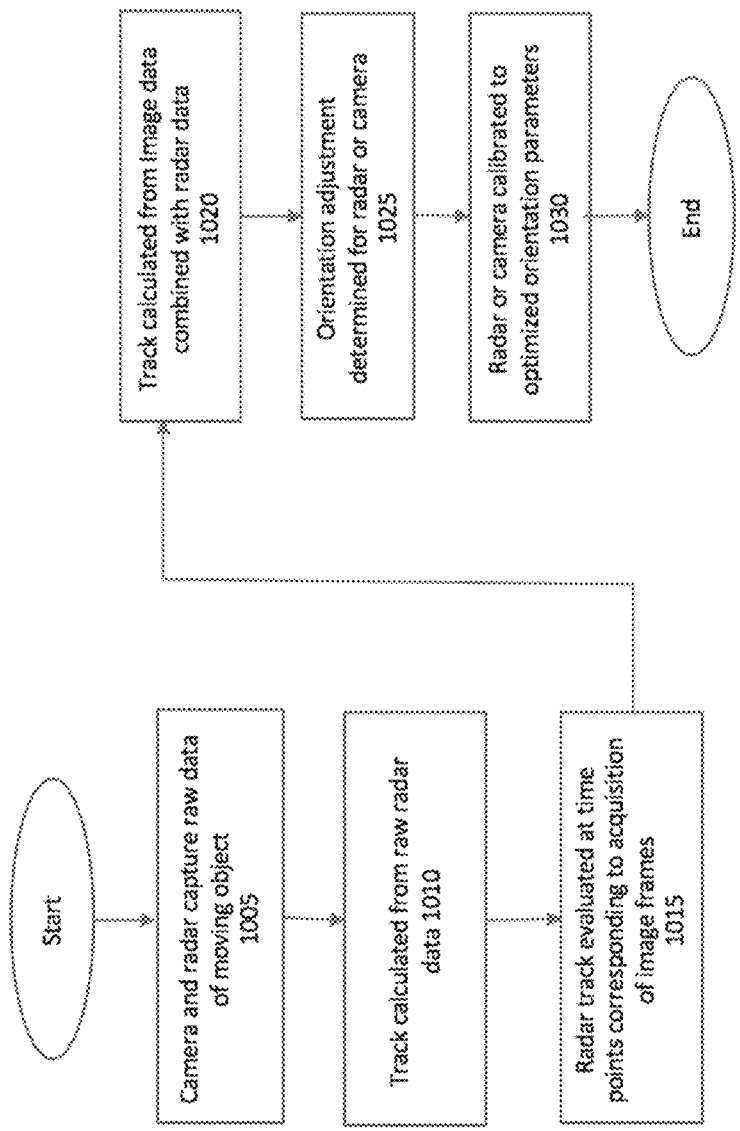
FIG. 10 shows a method for calibrating an orientation of the radar in FIG. 9 relative to a camera based on trajectory data of an object, e.g., a baseball pitch.

FIG. 10 shows a method 1000 for calibrating an orientation of a radar, e.g., the radar 902, relative to a camera, e.g. the narrow camera 906, based on trajectory data of an object, e.g. a baseball pitch. In 1005, sensor data corresponding to an object trajectory is acquired by the radar 902 and the camera 906. For example, the object may be a baseball and the trajectory may correspond to a pitch. In 1010, a track is determined for the radar data for calibration purposes. For example, in this embodiment, three-dimensional position data is calculated from the raw radar data (the radar data including range and velocity data) and processed using initial parameters. The track may be any mathematical, graphical or logical representation of the path of the object based on the raw data and may be represented in various ways and in various spaces.

For example, in one embodiment, a polynomial may be fit to the position data, allowing the polynomial to be evaluated and a position of the object to be determined at any time during flight. Another parametric representation could be a state vector at time t=t0 and a dynamical model allowing extrapolation to any time t1≠t0. For a sports ball, the state vector could represent the ball position, velocity, spin, spin axis, etc., and the dynamical model may account for, among other things, drag and lift on the ball. Parametric representations such as these, once the coefficients of the polynomial or the state vector coordinates have been determined, allow for evaluating object positions without having access to the raw measurement data. Thus, the raw data may be discarded prior to performing inter-sensor calibration.

This is advantageous for systems where parametric representation is a good model for the data, or where it is impractical to store the raw data. When the parametric representation is used, the optimization may take place in the parameter space instead of the space (or a projection of the space) in which the actual measurements are represented. As would be understood by those skilled in the art, in situations in which the cycle of measurements of the various sensors to be intercalibrated are synchronized (i.e., where each measurement of one sensor corresponds precisely in time to a measurement from another sensor) the raw data from each of the sensors for the same times may be directly compared for calibration.

In other embodiments, the ball position at time t=t0 may be represented by the nearest measurement in time to t0, or by a weighted average of the k measurements of the ball closest in time to t0. In these representations, the track is represented by the raw measurement data, e.g., peaks in a radar spectrum, or by object positions or pixel locations for other sensors, and a method for extracting from the raw data, at any given time, the position or other characteristics of the object. The raw measurement data may be smoothed, or have outliers removed, prior to use in the tracking/calibration process as would be understood by those skilled in the art. It is noted that any such method, parametric or non-parametric, of determining the track of an object from the raw data represents assumptions about the nature of the track and the noise on the measurements.

In 1015, the track derived from the radar data is evaluated at time points corresponding to the acquisition of each of the image frames. If a polynomial is used to represent the track, then the radar polynomial is evaluated at each of the time instants at which a frame was acquired by the camera 906 to determine a radar position corresponding to those time instants. However, as discussed above, other track representations of the radar data may be evaluated differently to extract the radar positions.

In 1020, the image data is combined with the radar range data (i.e., the data corresponding to a distance of the object from the radar at each of the time instants at which the images were captured) to determine 3D image positions, i.e., a camera track. Specifically, the angular positions of the object in the images is combined with the range measurements from the radar to determine the camera track. The range measurement is used to un-project the vision points (angular measurements) from the image plane into a 3D space, or, in other words, a transform is used to define a 3D space based on the combined radar range measurements and vision points. Thus, after 1015 and 1020, a pair of positions (a radar position and an image position) has been determined in a 3D coordinate system, e.g., global coordinates, for each of the time instants at which image data was acquired. As detailed above, the image position is not derived strictly from image data, but rather incorporates the range data from the radar (i.e., a distance from the radar) into the determination of the image position. In an alternate embodiment, the radar track in 3D space may be projected into the 2D image plane. For example, the radar measurements may be transformed to define positions at which the object will be located in a 2D image plane.

As would be understood by those skilled in the art, an imager may generate distortion that varies at different locations within the image plane. This distortion represented, e.g., as a function based on pixel locations, may be applied to detected positions of the ball (e.g., in pixels) to determine corrected angular positions of the ball in a corrected 2D plane. These corrected angular positions may then be compared to the angular positions determined based on the radar data for calibration purposes. Alternatively, an obverse of this distortion function may be applied to the radar data to determine angular positions in the uncorrected image data represented by the radar data and this data may then be compared to uncorrected image data for calibration purposes.

In 1025, for each pair of radar and image positions thus determined, a change in orientation (i.e., a tilt/pan adjustment), is calculated for either one of the camera 906 or the radar 902 that would make the two positions coincide. In other words, the tilt and the pan (i.e., an orientation) of the radar or the camera are the external parameters being optimized. Either one of the camera 906 or the radar 902 may have its parameters optimized, however, if the radar orientation is updated to match that of the camera then the implementation may be slightly simpler since the camera is used for the baseline calculation, as discussed above. However, updating the camera orientation is mathematically equivalent to updating the radar orientation so long as the mapping to real world coordinates is also updated. For each pitch, the median of the tilt/pan for all of the detection pairs for the pitch is determined as the tilt/pan adjustment per pitch. The set of tilt/pan adjustments for multiple consecutive pitches may be filtered using a stochastic or mini-batch gradient approach, as described above. In 1030, the radar or the camera is calibrated with new external parameters corresponding to the determined tilt/pan adjustment.

As discussed above, in the method 1000, the median tilt/pan for the camera is determined per pitch and the camera parameters are adjusted in accordance therewith. This approach is more heuristic than using an optimized cost function, as described above, and may make the calibration algorithm more tolerant to outliers. Another aspect of the method 800 is that, rather than determining independent tracks for each of a plurality of sensors and comparing those tracks, the method 1000 first combines camera data with radar data to determine a camera track, and this (combined) camera track is then compared to a radar track derived strictly from the radar data.

Figure 7A:
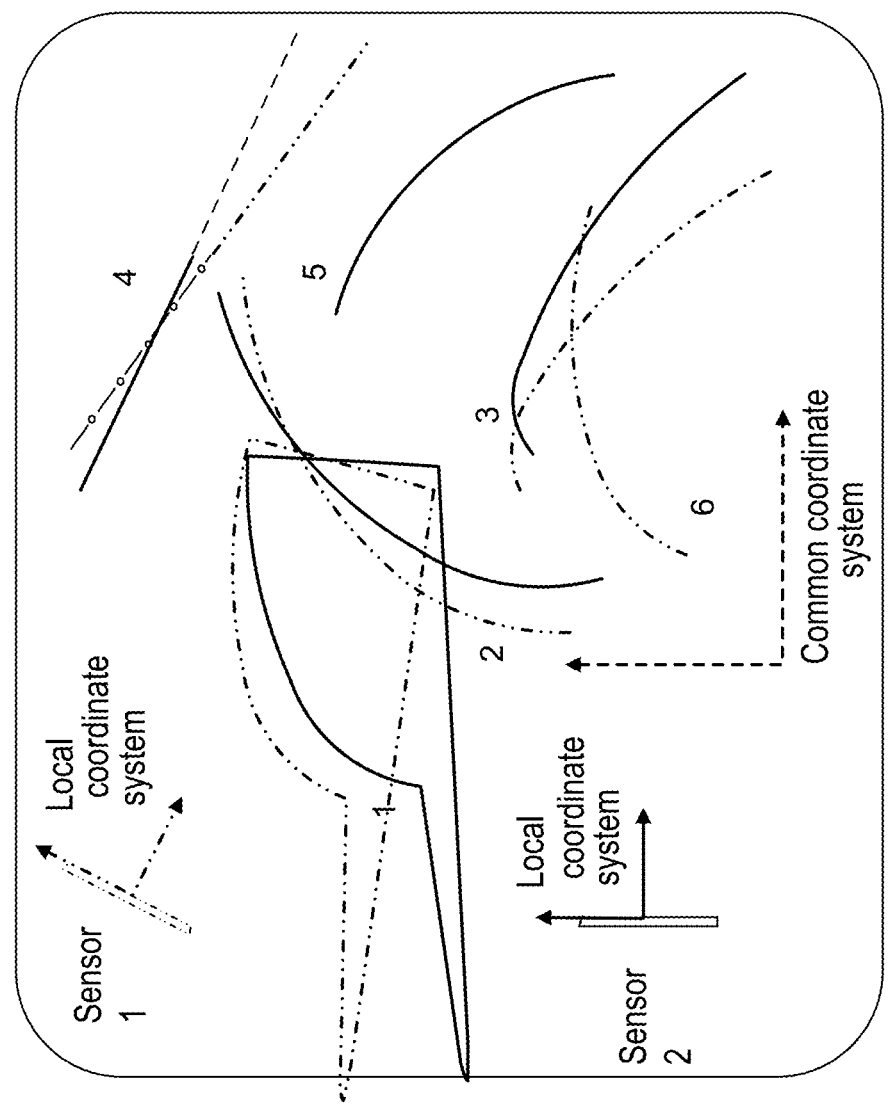
FIGS. 7a-7b show an illustration of synthetic data before and after running the exemplary inter-sensor calibration.
Figure 7B:
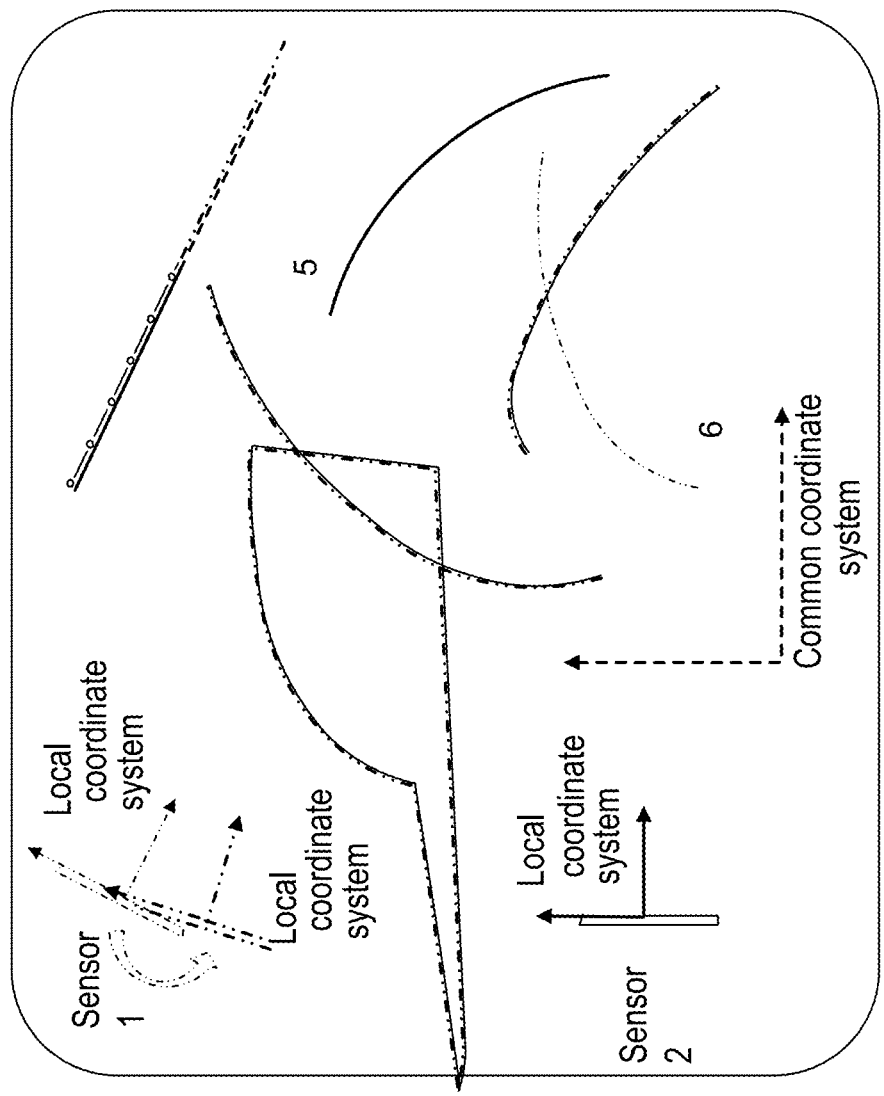

FIGS. 7a-7b show an illustration of synthetic data before and after running the exemplary inter-sensor calibration. In FIG. 7a, first and second sensors have tracked a plurality of moving objects and the tracks have been initially matched by the CP 410. The tracked objects have been given a number 1-6 for clarity. For objects 1-3, the sensors have captured overlapping data sufficient for running the calibration. For object 4, portions of the tracks have been arrived at by extrapolating a dynamical model forwards and backwards in time, visualized by dashes. For object 5, only the second sensor has produced a track. In other words, none of the tracks calculated by the first sensor have been matched to a track calculated by the second sensor. For object 6, the opposite situation has occurred—only the first sensor has produced a track for the object. The tracks display significant residuals in their positional estimates, visualized by the tracks not overlapping in space.

In FIG. 7b, the inter-sensor calibration has been run. In this example, only the external parameters of the first sensor have been optimized such that matched tracks agree in an optimal manner based on their positional residuals. As shown in FIG. 7b, the tracks of the first sensor have been both translated and rotated.

Figure 8A:
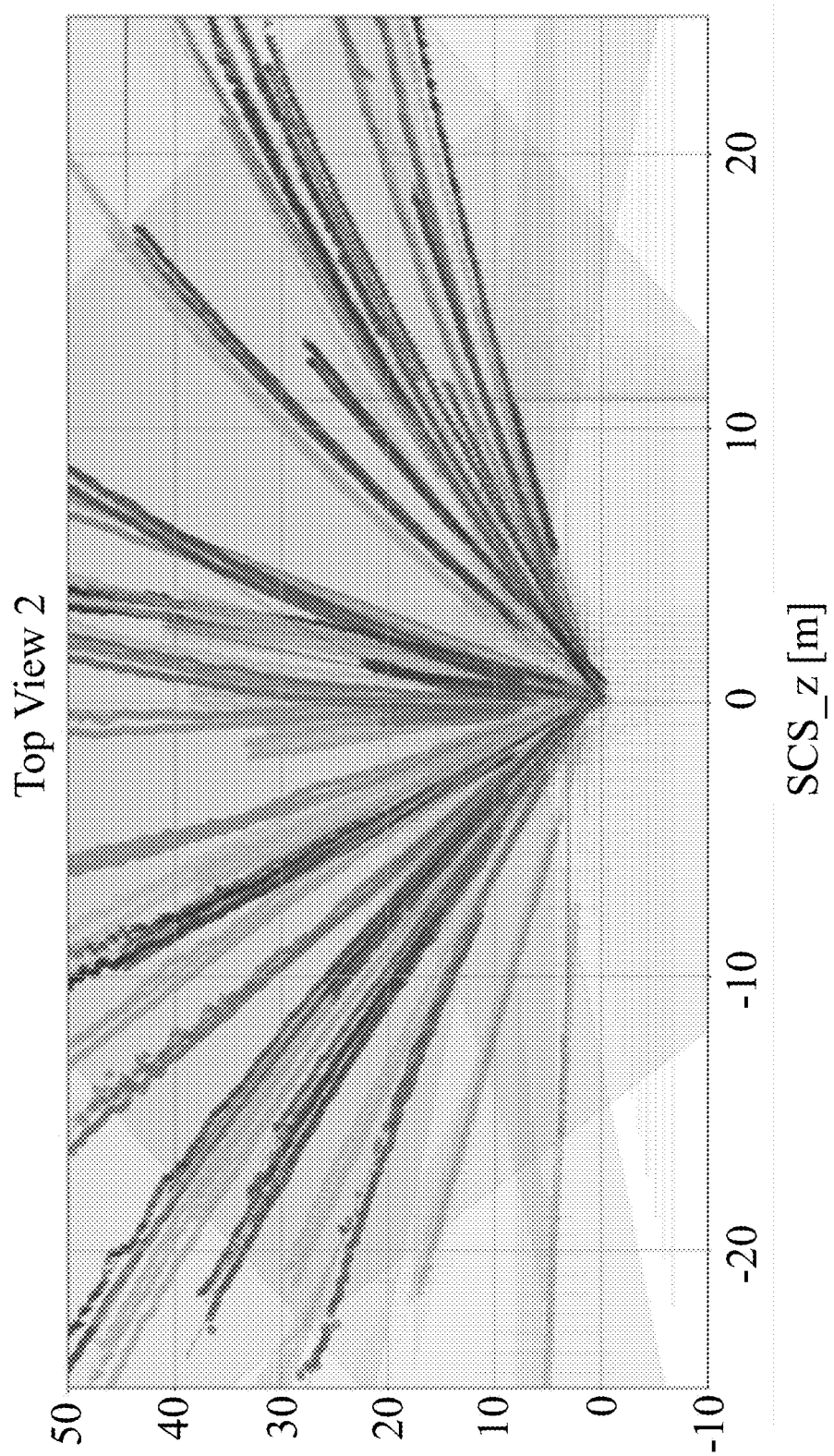
FIGS. 8a-8b show an illustration of actual measured data before and after running the exemplary inter-sensor calibration.
Figure 8B:
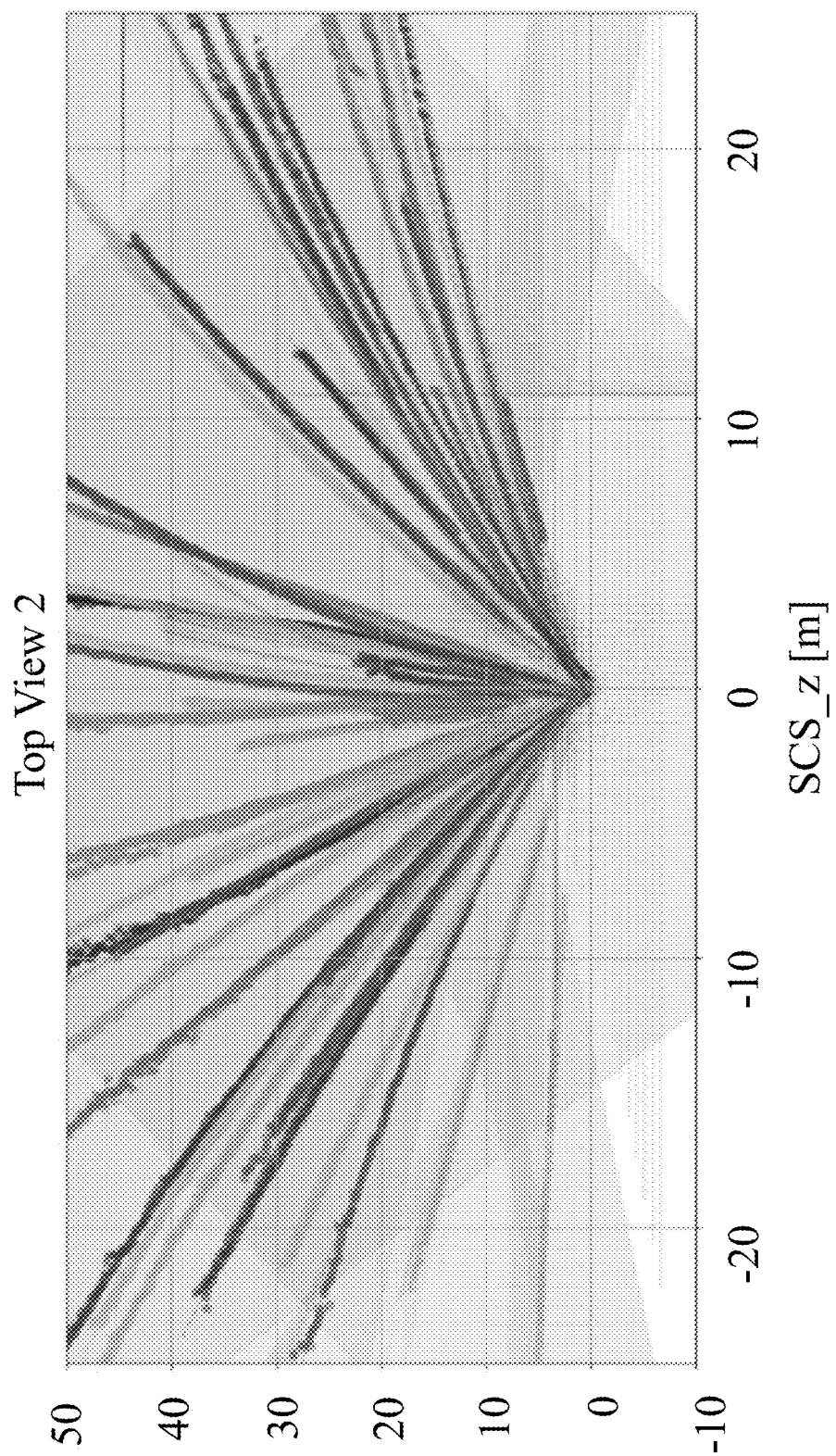

FIGS. 8a-8b show an illustration of actual measured data before and after running the exemplary inter-sensor calibration. The illustration shows a top view of the tracks of a number of baseballs struck with a baseball bat at an MLB stadium. The sensors used to generate the tracks are radars. Only tracks that have been matched across radars are shown. To every track captured with every radar, a dynamical model has been fitted that both estimates the ball's position from the time of being struck until landing as well as quantifying a confidence in the radar's estimate of the ball's position. These are shown as faded error bars and are used as weights in the cost function to be minimized. Every tracked ball has been given a marker associated with the radar having tracked it.

In the uncorrected data shown in FIG. 8a, there exists a clear discrepancy between estimates of the ball's positions across radars. In the corrected data shown in FIG. 8b, following the inter-sensor calibration procedure, the internal parameters of the radars (i.e., their phase-offsets) have been optimized and updated, such that the residuals have been significantly reduced.

The invention claimed is:

1. A method, comprising:
capturing radar data with a radar and image data with a camera in a multi-sensor tracking system, the radar and image data corresponding to a path of an object, the radar data including radar range data and radar velocity data for the object and the image data including image angular position data for the object;
generating an initial radar track using the radar data and initial radar parameters associated therewith stored to memory;
generating an initial camera track using the image angular position data, initial camera parameters associated therewith stored to the memory, and the radar range data;
calculating one of:
first correction parameters to be applied to the radar data by comparing positions for the object from the initial radar track and the initial camera track wherein, the first correction parameters are selected so that, when applied to the radar data to generate a first corrected track, a degree of correspondence between the first corrected track and the initial camera track is higher than a degree of correspondence between the initial radar track and the initial camera track; and
second correction parameters to be applied to the image angular position data by comparing positions for the object from the initial radar track and the initial camera track wherein, the second correction parameters are selected so that, when applied to the image angular position data to generate a second corrected track, a degree of correspondence between the second corrected track and the initial radar track is higher than a degree of correspondence between the initial radar track and the initial camera track; and
storing the first or second correction parameters to the memory for generating further initial radar tracks or initial camera tracks using further radar data or further camera data and the first or second correction parameters without manual intervention to the radar or camera.

2. The method of claim 1, further comprising calibrating either the radar with the first correction parameters or the camera with the second correction parameters.

3. The method of claim 1, wherein the first correction parameters comprise an optimized orientation of the radar and wherein the second correction parameters comprise an optimized orientation of the camera, the method further comprising:
determining one of a tilt adjustment and a pan adjustment to the initial radar parameters to calibrate the radar to a corrected orientation based on the first correction parameters and a tilt adjustment and a pan adjustment to the initial camera parameters to calibrate the camera to a corrected orientation based on the second correction parameters.

4. The method of claim 3, further comprising:
fitting a polynomial to the initial radar track; and
evaluating the polynomial at a series of time points corresponding to times at which image data was acquired to determine a radar position corresponding to each time point in the series.

5. The method of claim 4, further comprising:
determining a series of tilt and pan adjustments to one of the radar and the camera by comparing the polynomial and the camera track at each of the time points in the series;
determining a median for the series of tilt and pan adjustments as median tilt and pan adjustments; and
low pass filtering the median tilt and pan adjustments.

6. The method of claim 3, wherein the initial radar track is represented by a state vector and a dynamical model, the state vector representing path parameters of the object and the dynamical model accounting for lift and drag on the object.

7. The method of claim 1, wherein the radar range data is used to expand the image angular position data to 3D coordinates.

8. The method of claim 1, wherein the multi-sensor tracking system is implemented at a baseball field and the object is a baseball.

9. A system, comprising:
a central processing arrangement in communication with a radar and a camera in a multi-sensor tracking system, the central processing arrangement receiving radar data from the radar and camera data from the camera corresponding to a path of an object, the radar data including radar range data and radar velocity data for the object and the camera data including image angular position data for the object, the central processing arrangement generating an initial radar track using the radar data and initial radar parameters associated therewith stored to memory, the central processing arrangement generating an initial camera track using the image angular position data, initial camera parameters associated therewith stored to the memory, and the radar range data, and the central processing arrangement calculating one of:
first correction parameters to be applied to the radar data by comparing positions for the object from the initial radar track and the initial camera track wherein, the first correction parameters are selected so that, when applied to the radar data to generate a first corrected track, a degree of correspondence between the first corrected track and the initial camera track is higher than a degree of correspondence between the initial radar track and the initial camera track; and
second correction parameters to be applied to the image angular position data by comparing positions for the object from the initial radar track and the initial camera track wherein, the second correction parameters are selected so that, when applied to the image angular position data to generate a second corrected track, a degree of correspondence between the second corrected track and the initial radar track is higher than a degree of correspondence between the initial radar track and the initial camera track; and
the central processing arrangement storing the first or second correction parameters to the memory for generating further initial radar tracks or initial camera tracks using further radar data or further camera data and the first or second correction parameters without manual intervention to the radar or camera.

10. The system of claim 9, wherein the first correction parameters comprise an optimized orientation of the radar and wherein the second correction parameters comprise an optimized orientation of the camera, wherein the central processing arrangement determines one of a tilt adjustment and a pan adjustment to the initial radar parameters to calibrate the radar to a corrected orientation based on the first correction parameters and a tilt adjustment and a pan adjustment to the initial camera parameters to calibrate the camera to a corrected orientation based on the second correction parameters.

11. The system of claim 10, wherein the central processing arrangement fits a polynomial to the initial radar track and evaluates the polynomial at a series of time points corresponding to times at which image data was acquired to determine a radar position corresponding to each time point in the series.

12. The system of claim 11, wherein the central processing arrangement determines a series of tilt and pan adjustments to one of the radar and the camera by comparing the polynomial and the camera track at each of the time points in the series and determines a median for the series of tilt and pan adjustments as median tilt and pan adjustments, the system further comprising a low pass filtering arrangement filtering the median tilt and pan adjustments.

13. The system of claim 10, wherein the central processing arrangement represents the initial radar track as a state vector and a dynamical model, the state vector representing path parameters of the object and the dynamical model accounting for lift and drag on the object.

14. A method, comprising:
capturing first sensor data with a first sensor and second sensor data with a second sensor in a multi-sensor tracking system, the first and second sensor data corresponding to a path of an object as the object traverses a first field of view of the first sensor and a second field of view of the second sensor;
generating an initial first track using the first sensor data and initial first sensor parameters associated therewith stored to memory;
generating an initial second track using the second sensor data and at least one aspect of the first sensor data, where the at least one aspect of the first sensor data is used to expand the second sensor data into a three-dimensional space;
calculating one of:
first correction parameters to be applied to the first sensor data by comparing positions for the object from the initial first track and the initial second track wherein, the first correction parameters are selected so that, when applied to the first sensor data to generate a first corrected track, a degree of correspondence between the first corrected track and the initial second track is higher than a degree of correspondence between the initial first track and the initial second track; and second correction parameters to be applied to the second sensor data by comparing positions for the object from the initial first track and the initial second track wherein, the second correction parameters are selected so that, when applied to the second sensor data to generate a second corrected track, a degree of correspondence between the second corrected track and the initial first track is higher than a degree of correspondence between the initial first track and the initial second track; and storing the first or second correction parameters to the memory for generating further initial first or second tracks using further first or second data and the first or second correction parameters without manual intervention to the first or second sensors.

\* \* \* \* \*